United States Patent [19]

DeJaeger et al.

[11] Patent Number: 4,693,876
[45] Date of Patent: Sep. 15, 1987

[54] PROCESS FOR THE PREPARATION OF LINEAR POLYCHLOROPHOSPHAZENE

[75] Inventors: Roger DeJaeger, Chereng; Guy Pagniez, Lescar; Philippe Potin, Billere, all of France

[73] Assignee: Societe Nationale Elf Aquitaine, Paris, France

[21] Appl. No.: 882,958

[22] PCT Filed: Oct. 15, 1985

[86] PCT No.: PCT/FR85/00294
§ 371 Date: Aug. 14, 1986
§ 102(e) Date: Aug. 14, 1986

[87] PCT Pub. No.: WO86/02344
PCT Pub. Date: Apr. 24, 1986

[30] Foreign Application Priority Data

Oct. 17, 1984 [FR] France ............................. 84 15892

[51] Int. Cl.$^4$ ............................................. C01B 25/10
[52] U.S. Cl. .................................................. 423/300
[58] Field of Search ........................................ 423/300

[56] References Cited

U.S. PATENT DOCUMENTS 4,377,558  3/1983  DeJaeger et al. ................... 423/300
4,544,536  10/1985  DeJaeger et al. .
4,554,113  11/1985  Abou Chakra et al. ............ 423/300

Primary Examiner—John Doll
Assistant Examiner—Wayne A. Langel
Attorney, Agent, or Firm—Burgess, Ryan & Wayne

[57] ABSTRACT

A process for preparing linear polychlorophosphazenes having a terminal —$PXCl_2$ group, wherein X is O or S, by polycondensation of a monomer of the formula $P_2NXCl_5$, by heating to release $PXCl_3$ and continuing the heating after the evolution of $PXCl_3$ has stopped. In the process, at least the heat induced polycondensation phase after evolution of $PXCl_3$ has stopped is carried out in solution in a medium which is a solvent for both the monomer and the polymer and which is inert to the constituents of the polycondensation reaction. The process reduces the amount of cross-linking and produces high molecular weight polymers in a reproducible way.

14 Claims, No Drawings

PROCESS FOR THE PREPARATION OF LINEAR POLYCHLOROPHOSPHAZENE

The invention is a process for the preparation of linear polychlorophosphazene having a terminal group —$PXCl_2$, wherein X designates an oxygen or sulfur atom, by polycondensation of the $P_2NXCl_5$ monomers.

BACKGROUND OF THE INVENTION

It is known that by heating compounds having the formula $P_2NXCl_5$, wherein X designates an oxygen or sulfur atom, under conditions of pressure and temperature adequate to release $PXCl_3$, there are formed linear polychlorophosphazenes having a terminal group —$PXCl_2$. Thus, in French Pat. No. 79 24037 (publication No. 2466435) there is described the preparation of linear polychlorophosphazenes having a terminal group dichlorophosphoryl of the formula —$POCl_2$ by polycondensing the compound P—trichloro N-dichlorophosphoryl monophosphazene of the formula $P_2NOCl_5$ by heating under pressure and temperature conditions which release $POCl_3$. In French patent application No. 83 11264 of July 6, 1983 (publication No. 2548652) in applicant's name there is described the preparation of linear polychlorophosphazenes having a terminal group dichlorothiophosphoryl of the formula —$PSCl_2$ by polycondensing the compound P-trichloro N-dichlorothiophosphoryl monophosphazene of the formula $P_2NSCl_5$ by heating under pressure and temperature conditions to cause release of $PSCl_3$.

The linear polychlorophosphazenes formed have a terminal group —$PXCl_2$ and correspond to the formula:

 (I)

wherein n is a number equal to or greater than 4. It is possible to control the value of n to obtain chains of medium length.

Thus, n can be from 4 to 1000, for example, or even up to values as high as 5000 or more.

Without being bound by this hypothesis, it is thought that the polycondensation of $P_2NXCl_5$ the formula of which can be represented are:

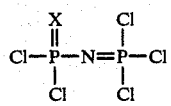

is carried out according to the reaction diagram:

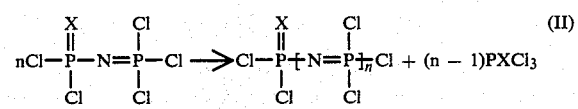 (II)

Formula (II) represents the linear polychlorophosphazenes having the formula (I).

Despite undeniable advantages and the simplicity of the process, the high rate of conversion of the monomer and the relatively low cost of said monomer, the above cited process for preparation of linear polychlorophosphazene with a terminal group —$PXCl_2$ by polycondensation of the $P_2NXCl_5$ monomer, by heating, is not entirely satisfactory inasmuch as it is not easy to obtain a high degree of polycondensation in a reproducible manner.

In fact, when the release of $PXCl_3$ stops, the medium degree of polycondensation of the linear polychlorophosphazene formed is low, generally, on the order of n of from about 20 to 30, which means that the polychlorophosphazene products are of short chain length. To obtain a polycondensation product having a higher degree of polycondensation, the products of short chain length must react between themselves by their ends to form products of long chain length, which requires that the polycondensation be continued after the termination of the release of the $PXCl_3$ compound. The course of this second phase of the polycondensation is very hard to control and the production of uncrosslinked polychlorophosphazenes having a high degree of polycondensation that is above about 100 is difficult to attain. In fact, the risk of cross-linking increases with the increase in the length of the polymer chains and this phenomenon develops in a manner that changes from one batch to the other. Therefore, what results is poor reproducibility when it is sought to obtain high degrees of polycondensation. This constitutes a serious handicap for industrially carrying out the process, since most of the application of the linear polychlorophosphazenes call for products of high molecular weight, that is, products having a high degree of polycondensation.

The invention provides an improvement on the above cited process for preparation of linear polychlorophosphazenes with —$PXCl_2$ terminal groups which makes it possible to minimize the cross-linking phenomena in the course of the polycondensation and thus to obtain in a reproducible manner high degrees of polycondensation.

BRIEF SUMMARY OF THE INVENTION

The process according to the invention for preparing linear polychlorophosphazenes having a terminal group —$PXCl_2$, wherein X is an oxygen or sulfur atoms, is of the type in which a monomer having the formula $P_2NXCl_5$ is polycondensed by heating under pressure and temperature conditions adequate for releasing $PXCl_3$, continuing said heating after the release of $PXCl_3$ ceases, and it is characterized by carrying out, at least the polycondensation phase that follows the release of $PXCl_3$, by working in solution in a medium that simultaneously dissolves the monomer and the polychlorophosphazene that forms and is inert in respect to the constituents of the polycondensation reaction.

DETAILED DESCRIPTION OF THE INVENTION

The process of the invention can be practiced by carrying out a polycondensation of the monomer by working a bulk reaction mixture until the release of $PXCl_3$ stops, then adding a selected solvent to the reaction mixture, resulting from the polycondensation to bulk to form a solution and maintaining the solution obtained at an appropriate temperature to effect a final polycondensation in solution.

The solvent can also be added to the bulk reaction mixture during polycondensation phase with release of $PXCl_3$, said addition being possible at anytime during the course of the polycondensation phase with release of $PXCl_3$.

The solvent is preferably present at the beginning of the polycondensation of the monomer.

When the solvent is added to the polycondensation reaction mixture during the bulk polycondensation phase with release of $PXCl_3$, or when it is present from the start of the polycondensation of the monomer, the solvent must not form an azeotrope with the PXCl$_3$ compound and must have a higher boiling temperature, preferrably at least 20° C., higher than that of said PXCl$_3$ compound.

The solvent used for carrying out the polycondensation of the monomer in solution can comprise only one solvent or a mixture of solvents. Said solvent can comprise preferably one or more compounds selected from aromatic hydrocarbons and chlorinated derivatives thereof. Examples of such solvents are benzene, naphthalene, diphenyl, chlorobenzene, dichlorobenzenes, trichlorobenzenes, tetrachlorobenzene, pentachlorobenzene, hexachlorobenzene, chloronaphthalenes, chlorodiphenyls and the like.

A single polycondensation in solution or a polycondensation in bulk with a subsequent polycondensation in solution, can be carried out at temperatures varying between about 125° C. and 380° C. and preferably from about 190° C. to 350° C. and most preferably, from about 210° C. to 300° C.

The pressures used for the polycondensation are generally from about atmospheric pressure to about 60 bars. However, when a solvent having a very high boiling point is used, it is possible to carry out the polycondensation under reduced pressure, that is, below atmospheric pressure, in order to lower the boiling temperature of the solvent and thus to avoid having to work at too high a temperature.

When the polycondensation is carried out at about atmospheric pressure, the polycondensation in solution is effected in a solvent having a boiling point at atmospheric pressure at least equal to the temperature selected from said condensation in solution. Likewise when the polycondensation is effected under pressure, the solvent used for the polycondensation in solution has a boiling temperature at the pressure considered that is above the temperature selected for said polycondensation in solution.

The quantity of solvent to be used for effecting the polycondensation in solution can vary over a broad range. It is preferable to avoid using a large quantity of solvent, since a large dilution slows the polycondensation, requires an increase of the volume of the reactor and makes it necessary to recycle a large amount of solvent. The weight of solvent to be used for the polycondensation in solution preferably represents from about 0.1 to 5 times and more preferably from about 0.3 to 2 times the weight of monomer involved in the polycondensation reaction. It is necessary to utilize sufficient solvent to maintain the materials in solution.

The subsequent substitution reactions of the chlorine atoms of the polychlorophosphazene resulting from the polycondensation, have to be taken into consideration in selecting the solvent to be used for the polycondensation in solution. For example, if it is desired to substitute alcoholate residues for chlorine of the polychlorophosphazene, it has to be taken into consideration that the chlorine atoms eventually present in the molecule of solvent can react with the alcoholates. To avoid losses of solvent and alcoholate during the substitution treatment, either a chlorinated solvent capable of being eliminated easily from the polycondensate by distillation or a non-chlorinated solvent should be selected.

The linear polychlorophosphazenes obtained by the process according to the invention can be used in applications described in connection with the linear polychlorophosphazenes of French Pat. No. 79 24037. In particular they can be subjected to different reactions of replacement of the chlorine atoms they contain by organic residues or others, especially by alkoxy or aryloxy residues for the production of polyorganophosphazenes.

An important advantage of the process according to the invention is that at the end of the polycondensation, the reaction mixture containing the polycondensate is, after cooling to 60°–70° C., in the form of a more or less viscous mass that can be easily diluted with solvent such as benzene to very easily form a solution in which the substitution reaction can be carried out.

In a process of polycondensation entirely in bulk, the polycondensate obtained requires several hours to dissolve in a solvent to form a solution useful for effecting the substitution reaction. The process according to the invention, therefore, makes it possible to provide the polymer in solution, which considerably reduces the time required to produce the polyorganophosphazenes.

The invention is illustrated by the examples that follow wich are non-limiting.

EXAMPLE 1

The polycondensation was carried out in a reactor consisting of a 500 ml spherical flask with three nozzles equipped with an internal temperature monitoring means, an inlet for the reagents and a reflux condenser topped by a distillation head, a horizontal condenser and a graduated collector, the whole being maintained under inert atmosphere. The spherical flask was immersed in a silicon oil bath heated by a heating magnetic stirrer which served to stir the contents of the reactor.

The reactor was charged with 372.34 g of P$_2$NOCl$_5$ prepared as described in Example 1 of French Pat. No. 79 24037 which is incorporated by reference and 184.5 1,2,4 trichlorobenzene having a boiling point of 210° C. at atmospheric pressure as a solvent.

The contents of the reactor were then stirred and brought to the reflux temperature of the solvent, then maintained, while stirring, at 210° C., for 86 hours. At the end of 86 hours, the release of POCl$_3$ stopped; the quantity of POCl$_3$ recovered represented 98% of the theoretical quantity. The heating of the reaction medium was continued at the above temperature for 118 additional hours. At the end of the additional time, trichloro-1,2,4 benzene was removed by distillation under vacuum and the polycondensate recovered was dissolved in benzene.

A control test of the presence of crosslinked gels was effected by filtration on a MILLIPORE® 0.4/μm filter of a fraction of said solution in benzene. No gels were detected.

The benzene solution of the polycondensate of the polychlorophosphazene formed by polycondensation of P$_2$NOCl$_5$, was treated with CF$_3$CH$_2$ONa to replace the chlorine atoms of the polycondensate by less reactive CF$_3$CH$_2$O— groups, which provided a polymer easier to manipulate and on which molecular weights can be determined. The treatment by CF$_3$CH$_2$ONa was effected under conditions similar to those described by H. R. ALLCOCK et al (Inorg. Chem. 1966,5, p. 1714) for the corresponding treatment of polydichlorophosphazenes.

The trifluoroethoxylated polymer obtained had a weight average molecular weight ($\overline{M}w$) determined by diffusion of light, equal to 371000, an intrinsic viscosity ($\eta$) determined at 30° C. in tetrahydrofuran (abrreviated THF) of 45 ml/g and a medium degree of polycondensation by weight $\overline{DP}$ of 1530.

$\overline{DP}$ represents the quotient of $(\overline{Mw})$ divided by the molecular weight of a polymeric moiety that is, of the —NP(CF$_3$CH$_2$O)$_2$-moiety of the trifluoroethoxylated polymer.

EXAMPLE 2

The method of operation was similar to that of Example 1. The release of POCl$_3$ lasted 83 hours and the heating phase of the reaction medium after the release of POCl$_3$ ceased was continued for an additional 115 hours.

The benzene solution of the polychlorophosphazene produced was free of gels.

The polytrifluoroethoxyphosphazene obtained by substitution of the chlorines of the polychlorophosphazene, as indicated in Example 1, had the following characteristics:

$\overline{Mw} = 318\ 000$
$[\eta]_{THF}^{30°\ C.} = 40$ ml/g
$\overline{DP} = 1310$

EXAMPLE 3

The method of operation was similar to that of Example 1 except that the trichloro-1,2,4 benzene was replaced by the same weight of naphthalene and polycondensation was carried out at the reflux temperature of the naphthalene that is, at 218° C., at atmospheric pressure. The release of POCl$_3$ lasted 101 hours and the heating phase of the reaction medium after the release of POCl$_3$ ceased, was continued for an additional 240 hours at the reflux temperature of the naphthalene.

At the end of this time, the reaction medium was cooled to 70° C. and diluted with benzene.

The benzene solution of the polychlorophosphazene obtained was free from gels.

The polytrifluoroethoxyphosphazene obtained by substitution of the chlorines of the polychlorophosphazene, as indicated in Example 1, had the following characteristics:

$\overline{Mw} = 328\ 000$
$[\eta]_{THF}^{30°\ C.} = 41$ ml/g
$\overline{DP} = 1350$

EXAMPLE 4

The method of operation was similar to that described in Example 1, except that the 1,2,4 trichloro benzene was replaced by 190 g tetrachlorodiphenyl and the polycondensation was carried out at 280° C.

The release of POCl$_3$ ceased at the end of 1.5 hours and the heating was continued for an additional 2 hours.

At the end of this time, the reaction medium was cooled to 70° C. and then diluted with benzene.

The benzene solution of the polychlorophosphazene obtained was free of gels.

The polychlorophosphazene was converted to polytrifluoroethoxyphosphazene by working as indicated in Example 1, but with an excess of CF$_3$CH$_2$ONa that took into account the chlorine of the tetrachlorodiphenyl left in the medium.

The resulting polytrifluoroethoxyphosphazene had the following characteristics:

$\overline{Mw} = 404\ 000$
$[\eta]_{THF}^{30°\ C.} = 48$ ml/g
$\overline{DP} = 1660$

EXAMPLE 5

The method was carried out in a double wall reactor with a capacity of 2 liters made of enameled steel and equipped with an internal temperature monitoring means, an inlet for the reagents and a reflux condenser topped successively by a distillation head, a horizontal condenser and a collector consisting of a glass tube made to resist pressure, the apparatus being maintained under inert atmosphere. The reactor was heated by circulation of oil between the double walls. The reactor included an anchor stirring system.

The reactor was charged with 992 g P$_2$NOCl$_5$ and 1000 g 1,4-dichloro benzene. The whole was maintained under a nitrogen pressure equal to 9 bars which permitted working at the reflux temperature of the 1,4-dichloro benzene at 280° C.

At the end of one hour of maintaining the reaction medium at 280° C. temperature, the release of POCl$_3$ stopped; and the heating of the reaction medium was continued at said temperature for an additional 2.5 hours.

The 1,4-dichloro benzene was then distilled under vacuum at 130° C. and the remaining product was diluted by benzene.

The benzene solution thus formed, which contained the polychlorophosphazene resulting from the polycondensation of the P$_2$NOCl$_5$, was free of gels.

The polytrifluoroethoxyphosphazene obtained by substitution of the chlorine atoms of the polychlorophosphazene, as indicated in Example 1, had the following characteristics:

$\overline{Mw} = 460\ 000$
$[\eta]_{THF}^{30°\ C.} = 53$ ml/g
$\overline{DP} = 1900$

EXAMPLE 6

The method was carried out following a method similar to the one used in Example 1, except that the 1,2,4 trichloro benzene was replaced by 740 g trichlorodiphenyl and the entire polycondensation was carried out at a temperature of 240° C. under atmospheric pressure.

At the end of 19 hours, wherein the reaction medium was maintained at 240° C., the release of POCl$_3$ ceased. After said release of POCl$_3$ ceased, the heating of the reaction medium was continued at 240° C. for an additional 36 hours.

At the end of that time, the reaction medium was cooled to 70° C. and then diluted with benzene.

The benzene solution containing the polychlorophosphazene was free of gels.

The polychlorophosphazene was transformed into polytrifluoroethoxyphosphazene by the method as indicated in Example 1, but with an excess of CF$_3$CH$_2$ONa that takes into account the chlorines of trichlorodiphenyl left in the medium.

The polytrifluoroethoxyphosphazene obtained by substituting CF$_3$CH$_2$O— for the chlorine atoms of the polychlorophosphazene, as indicated in Example 1, had the following characteristics:

$\overline{Mw} = 339\ 000$
$[\eta]_{THF}^{30°\ C.} = 42$ ml/g
$\overline{DP} = 1395$

EXAMPLE 7

Polycondensation of P$_2$NSCl$_5$. The monomer was synthesized by first preparing P$_3$NCl$_{12}$ by reacting PCl$_5$ on NH$_4$Cl in POCl$_3$, as indicated by SEGLING et al. (U.S. Pat. No. 3,231,327 incorporated herein by reference); then by reacting the compound P$_3$NCl$_{12}$ obtained with P$_2$S$_5$ by the method described by KHODAK and GILYAKROV (Izv. Akad. Nauk SSSR, Ser. Khim., 1979 (4), p. 924 incorporated herein by reference).

The polycondensation was effected following a method of operation analogous to that of Example 1, but using 350 g $P_2NSCl_5$ and 116 g 1,2,4-trichloro benzene.

The reaction medium was heated to its reflux temperature and the $PSCl_3$ was collected after 65 hours. After the release of the $PSCl_3$ compound ceased, the heating of the reaction medium was continued for an additional 89 hours at reflux temperature.

At the end of the heating period, 1,2,4 trichloro benzene was removed by distillation under vacuum and the polycondensate obtained was dissolved in benzene.

The benzene solution obtained was free of gels.

The polychlorophosphazene resulting of the polycondensation of $P_2NSCl_5$ was transformed into polytrifluoroethoxyphosphazene by the procedure as indicated in Example 1.

The polytrifluoroethoxyphosphazene obtained had the following characteristics:

$\overline{M}w = 156\ 500$ $8\ \eta]_{THF}^{30°\ C.} = 24$ ml/g $\overline{DP} = 640$

We claim:

1. A process for the preparation of linear polychlorophosphazenes having a terminal group $-PXCl_2$, wherein X is oxygen or sulfur, wherein a monomer of the formula $P_2NXCl_5$ is polycondensed to form a polycondensation mixture by heating to release $PXCl_3$ and said heating is continued after the release of $PXCl_3$ has ceased, wherein at least the heating, following the release of $PXCl_3$, is carried out in solution in a medium which is a solvent of the monomer and the polychlorophosphazene, said solvent being inert to the constituents of the polycondensation reaction.

2. A process according to claim 1, wherein the solvent comprises at least one compound selected from the group consisting of aromatic hydrocarbons and chlorinated derivatives thereof.

3. A process according to claim 2, wherein said solvent comprises compounds selected from the group consisting of benzene, naphthalene, diphenyl, chlorobenzene, trichlorobenzene, dichlorobenzene, tetrachlorobenzene, pentachlorobenzene, hexachlorobenzene, chloronaphthalene and chlorodiphenyl.

4. A process according to claim 1 wherein the polycondensation is carried out at a temperature between about 125° C. and 380° C.

5. The process of claim 1 wherein the polycondensation is carried out at a temperature of from about 190° C. to 350° C.

6. The process according to claim 1, wherein the polycondensation temperature is from about 200° C. to 320° C.

7. The process according to claim 1 wherein the polycondensation is carried out under a pressure of from about atmospheric pressure to about 60 bars.

8. The process of claim 1, wherein the weight of solvent for forming the solution is from about 0.1 to 5 times the weight of monomer subjected to the polycondensation.

9. The process of claim 4, wherein the weight of solvent for forming the solution is from about 0.1 to 5 times the weight of monomer subjected to the polycondensation.

10. The process of claim 1 wherein the solvent is added to the polycondensation mixture during the polycondensation with release of $PXCl_3$.

11. The process of claim 1 wherein the solvent is present at the beginning of the polycondensation of the monomer.

12. The process according to claim 10 wherein the solvent does not form an azeotrope with the $PXCl_3$ compound and has a boiling temperature higher, by at least by 20° C., than that of said $PXCl_3$ compound.

13. The process of claim 1, wherein the polycondensation is effected at atmospheric pressure at the boiling temperature of the solvent.

14. The process of claim 1 wherein the polycondensation is effected under pressure and the boiling temperature of said solvent under said pressure is at least equal to the temperature selected for the polycondensation in solution.

* * * * *